United States Patent [19]
Calamera

[11] Patent Number: 4,459,849
[45] Date of Patent: Jul. 17, 1984

[54] COMPACT FORCE MEASURING SYSTEM
[75] Inventor: John Calamera, Staten Island, N.Y.
[73] Assignee: The Bendix Corporation, Teterboro, N.J.
[21] Appl. No.: 462,173
[22] Filed: Jan. 31, 1983
[51] Int. Cl.$^3$ .............................................. G01P 15/13
[52] U.S. Cl. ................................................... 73/517 B
[58] Field of Search ............ 73/517 B, 516 R, 862.61, 73/517 R

[56] References Cited
U.S. PATENT DOCUMENTS 4,080,835  3/1978  Marques ............................. 73/517 B
4,131,020 12/1978  Hugli et al. ........................ 73/517 B
4,169,384 10/1979  Flanner et al. ..................... 73/517 B Primary Examiner—James J. Gill
Attorney, Agent, or Firm—Stanley N. Protigal

[57] ABSTRACT

A force measuring system is provided in which a force sensitive element (51) includes a movable capacitor plate (21) located between two fixed capacitor plates (19, 20). A pair of jewel bearings (52) are mounted to a support casting (55) and provides support for a force sensitive element (51). The support casting (55) also serves as a support for a hybrid integrated circuit (68) which, in turn, forms a support substrate for one of the fixed plates (19). A second fixed plate (20) may be mounted on the casting (55) via a substrate (69). The hybrid integrated circuit (68) is therefore in close proximity to a capacitor element (19-21). The hybrid circuit (68) provides output power to a torquer coil (37) which centers the force sensitive element (51), with current provided to the torquer coil (37) being indicative of force exerted on the force sensitive element (51).

The hybrid circuit is designed so that a power amplifier circuit can be added in order to provide additional current to the torquer coil (37) at relatively high measured forces. The power amplifier has little effect on output current at moderate force levels, and therefore the inclusion of the power amplifier on the hybrid circuit is optional, with the hybrid circuit being operable without the power amplifier.

The system exhibits a high degree of structural stability while being compact in size.

9 Claims, 3 Drawing Figures

COMPACT FORCE MEASURING SYSTEM

BACKGROUND OF THE INVENTION

This invention relates generally to force measuring systems and particularly to a compact force measuring system of the force balance type for measuring a sensed force.

Force measuring systems of the force balance type and including a capacitance bridge arrangement are well known in the art. The capacitance bridge arrangement includes a movable plate which is normally disposed in a null position between two fixed plates, whereupon the capacitance bridge is balanced. A force sensed by the system affects the movable plate so that the movable plate is displaced from the null position toward one or the other of the fixed plates to unbalance the bridge, whereupon a current is provided for energizing a torquer coil mounted on the movable plate. The coil provides a torque for restoring the movable plate to the null position. The torquer current is a measure of the sensed force. In devices of this type the torque is generated electromagnetically and is independent of the force sensing function, whereby the devices require additional hardware and suffer attendant inaccuracies. These problems are overcome by providing both the torquing and sensing functions within a common housing. Such a system is described in British Patent Specification No. 715,750 by Metcalfe, and U.S. Pat. No. 4,009,607, issued on Mar. 1, 1977, to William Ficken and assigned to The Bendix Corporation, assignee of the present invention. Such a system provides an accurate and reliable reading of force.

Such force balance sensors are limited in accuracy by the effects of the forces of friction, and by the physical size of the capacitor elements because the capacitor design is such that very small amounts of capacitance are provided by the capacitor. Where such a device is miniaturized, the capacitance is, of course, further decreased. Miniaturization also results in a requirement that bearing friction be reduced so that the frictional force remains insignificant relative to other forces exerted through the movable plate.

In order to minimize the effects of reduced capacitance from miniaturized force sensors, the feedback circuitry is installed as close as possible to the capacitor, thereby reducing the signal-to-noise ratio of the force sensor. In one configuration, represented by U.S. Pat. No. 4,131,020, issued Dec. 26, 1978, to Hugli, et al., a hybrid integrated circuit is mounted to a support in an adjacent relationship to the fixed plates of the capacitor. The displaceable plate of the capacitor and a coil from a substantial part of the seismic mass are electrically connected to the hybrid circuit. This arrangement enables the hydrid circuit to provide power to the coil and thereby maintain the arm in a null position between the two fixed capacitor plates.

The Hugli, et al. arrangement utilizes a pair of bearings which are mounted to leaf springs. A system of screws is used to force the leaf springs together in order to control bearing pressure (preload). This arrangement separates the bearings from the structure supporting the fixed capacitor plates and the hybrid circuit and also requires that the bearings be bonded to the springs, as by soldering. Adjustment in bearing spacing and pressure are made by the screws distorting the springs. This arrangement of bearings mounted on leaf springs therefore requires that the bearing be positioned by a secondary structure (the spring leafs) which is necessarily not an integral part of a rigid support for either the fixed plates of the capacitor or an integrated circuit.

Jewel bearings have been previously used in force sensors in order to provide enhanced wear properties and to reduce friction. Jewel bearing parts must be supported within special housing assemblies rather than merely being bonded to a metal substrate such as a leaf spring. This adds to the cost of the bearings, particularly where the supporting housing does not form a part of the spring adjustment arrangement.

It is accordingly an object of the invention to provide a miniature force sensor assembly in which jewel bearings are used and the bearings can be adjusted readily. It is a further object of the invention to provide a miniature force sensor in which a single supporting element supports both an active electronic circuit and a bearing assembly.

SUMMARY OF THE INVENTION

In accordance with this invention, a force measuring system is provided in which a support casting supports both a circuit board and a bearing assembly for a force sensitive element such as a seismic mass. One end of the force sensitive element forms a plate in a plate capacitor, and the capacitor forms a part of a feedback circuit located on the circuit board used to control the position of the force sensitive element. A coil mounted to the force sensitive element is energized by the feedback circuit in order to maintain the capacitive plate in a neutral position, with the energy needed to power the coil representing sensed force in the direction of movement of the swinging arm. The force sensitive element is supported by a bearing assembly which uses a pair of jewel bearings mounted through resilient means. The bearings are threaded into the support casting, with bearing pressure being controlled by the screwing of the bearings into the casting.

The feedback circuit is designed so that a power amplifier circuit can be added in order to provide additional current to the coil at relatively high measured forces. The power amplifier has little effect on output current at moderate force levels, and therefore the inclusion of the power amplifier on the hybrid circuit is optional, with the hybrid circuit being operable with the power amplifier.

This arrangement provides greater mechanical stability over and greater force measuring range than prior art force balance-type froce sensors.

DESCRIPTION OF THE PREFERRED EMBODIMENT

Figure 1:
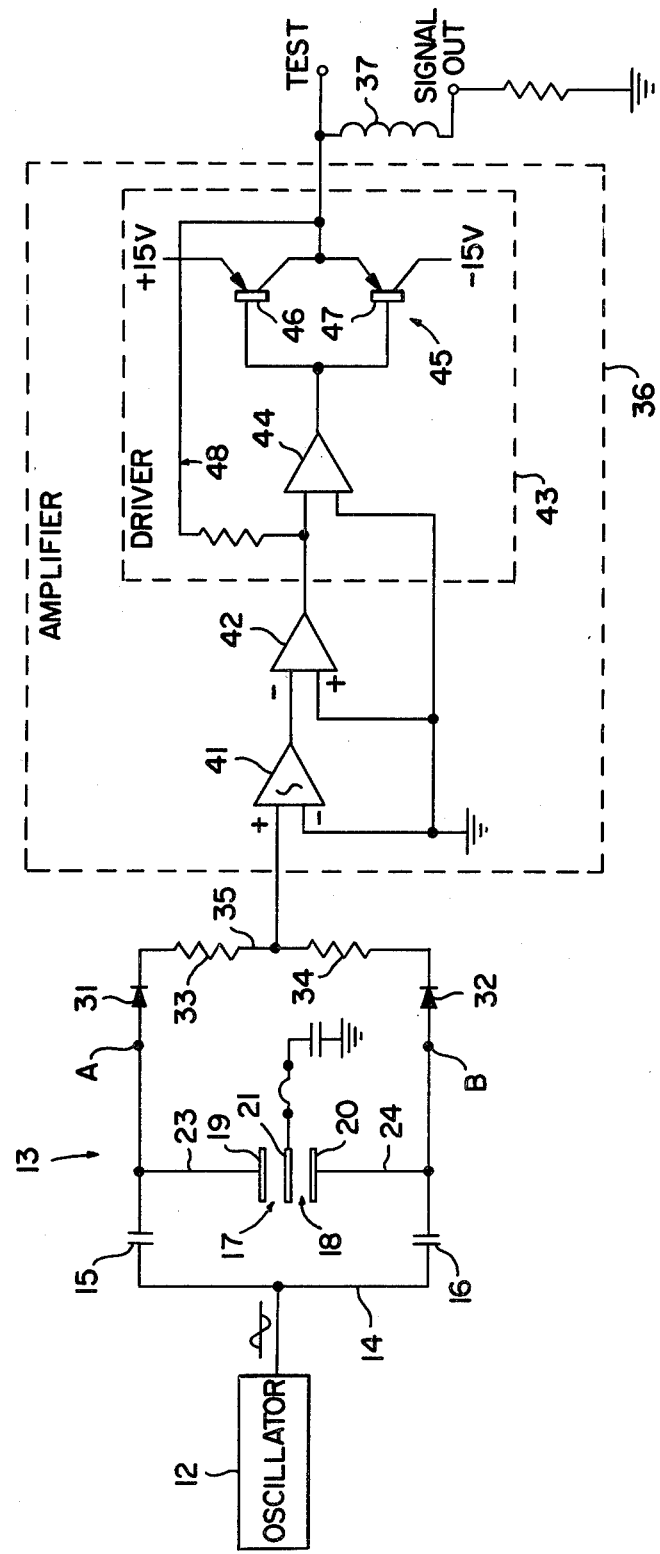
FIG. 1 shows a circuit which may be used in the preferred embodiment of the invention.

A capacitance type force measuring system uses a feedback circuit in order to maintain a movable plate of a capacitor in a normal position. While this can be accomplished with a number of specific circuits, a bridge circuit such as shown in FIG. 1 provides feedback in a simple and efficient fashion. Referring to FIG. 1, an oscillator 12 provides an alternating signal to be a bridge circuit 13. The oscillator can be, for example, a Colpitts type oscillator, which uses a tank circuit (not separately shown) to provide an alternating signal. Other signal sources which are capable of providing a suitable alternating signal will serve the purposes of the invention as well.

The alternating signal from the oscillator 12 is applied to an input of the bridge circuit 13, represented by conductor 14. The bridge circuit 13 inclues a pair of accurate fixed capacitors 15, 16 and a pair of variable capacitors 17, 18 formed by a pair of stationary or fixed plates 19, 20 and displaceable plate 21 mounted on a force sensitive element 51, which in the preferred embodiment is a seismic mass, as will be described later.

With reference to FIG. 1, the displaceable plate 21 is displaceably supported (as will be seen later) between the fixed plates 19, 20 and is normally in a null position, positioning the displaceable plate 21 midway between the fixed plates 19, 20. The displaceable plate 21 is A.C. grounded. Fixed plate 19 is connected to fixed capacitor 15 at conductor 23, and fixed plate 20 is connected to fixed capacitor 16 at conductor 24, thereby completing the bridge 13.

In operation, the bridge 13 is energized by the oscillator 12, with the AC signal therefrom being applied to conductor 14. In the preferred embodiment, the force being measured is acceleration. When no force is applied to the system of the invention, as under zero G acceleration conditions, the displaceable plate 21 remains in the null position and the bridge 13 will be in a balanced state, the values of variable capacitors 17 and 18 being equal. Upon an acceleration or other force being applied, the displaceable plate 21 will be displaced toward one of the fixed plates 19 or 20, as the case may be, to unbalance the bridge 13, whereupon a differential output will appear at conductors 23 and 24 and hence at bridge points A and B.

Still referring to FIG. 1, a pair of diodes 31, 32 are connected to bridge points A and B, respectively. The diodes provide corresponding DC outputs which are applied through resistors 33 and 34, respectively, to a circuit summing output at conductor 35, thereby providing an error signal. At conductor 35 the error signal is provided to an amplifier 36 which drives a torquer coil 37. The torquer coil 37 provides reactive force which causes the displaceable capacitor plate 21 to change position as will be seen later. This arrangement allows the torquer coil 37 to maintain the displaceable plate 21 in a null position, with power to the torquer coil 37 being proportional to acceleration. The amplifier 36 must provide sufficient gain to cause the torquer coil 37 to respond to changes in position of the displaceable plate 21 without causing the output to the torquer coil 37 to be so great as to destabilize the system.

Still referring to FIG. 1, a typical amplifier 36 would consist of an integrater 41 receiving the error signal from conductor 35. The integrator 41 would provide a high DC gain for the error signal. A frequency shaping amplifier 42 modifies the output from the integrator 41 so as to provide a decrease in amplifier gain as the displaceable plate 21 approaches a null position. The frequency shaping amplifier 42 provides an output which causes the output of the amplifier 36 to have a non-linear response to the extent that, when the displaceable plate 21 is significantly displaced from a null position, the amplifier 36 exhibits a high gain, but when the displaceable plate 21 is near the null position, the amplifier 36 has a significantly reduced gain. Typical gain values would be such that gain at the null position would result in a slope of 1. The displaceable plate 21 is considered to be significantly displaced before it touches one of the fixed plates 19, 20.

The output from the frequency shaping amplifier 42 is provided to a driver 43. The driver 43 includes a low power amplifier 44 which provides an output current to drive the torquer coil 37. When greater amounts of force are exerted to displace the displaceable plate 21 than could be compensated for by the output of the low power amplifier 44, a power amplifier 45, consisting of matching transistors 46 and 47, provides increased amplification. At low power, the power from the low power amplifier 44 is supplied to the torquer coil 37, with a minimum of effects from the power amplifier 45. A feedback circuit 48 minimizes effects from the power amplifier 45 at the low power. When output from the low power amplifier 44 increases, the power amplifier 45 provides an increased level of amplification, thereby increasing the force measuring range of the instrument. The power amplifier 45 is optional and the inventive system can be produced without the addition of the power amplifier 45. For this reason, the same hybrid integrated circuit design can be used for a force measuring system having the power amplifier 45 as for a force measuring system without a power amplifier.

Figure 2:
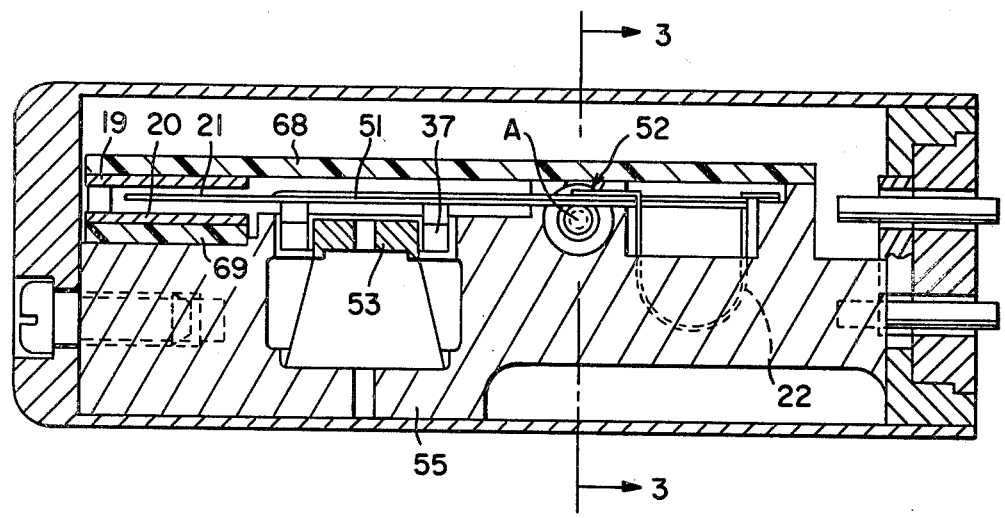
FIG. 2 shows a side view of the preferred embodiment of a force measuring sensor according to the present invention.
Figure 3:
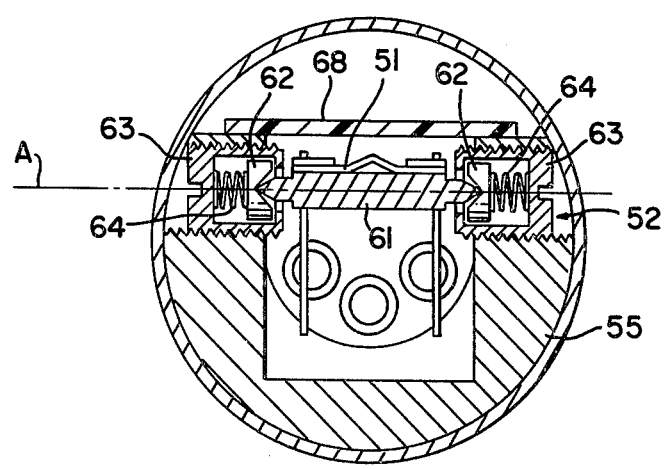
FIG. 3 shows a cross-sectional view taken along lines 2—2 of FIG. 2.

Referring to FIGS. 2 and 3, the displaceable plate 21 is mounted to and is a part of the aforementioned force sensitive element 51. In the preferred embodiment the force sensitive element 51 is a seismic mass for an accelerometer, although other forces can be measured by the inventive system as well. The force sensitive element 51 is pivoted along a bearing axis A using a jewel bearing assembly 52, with the jewel bearing assembly 52 permitting said movement about axis A. Force exerted on the force sensitive element 51 results in the displaceable plate 21 moving toward one of the fixed plates 19 or 20 depending on the direction of force. The torquer coil 37 acts in concert with a permanent magnet 53 in order to readjust the force sensitive element 51. In the preferred embodiment, the torquer coil 37 is fixed to the force sensitive element 51 and the magnet 53 is fixed to a stationary casting 55 which also supports the bearing assembly 52.

Referring particularly to FIG. 3, the jewel bearing assembly 52 includes a pivot 61 which is a part of the force sensitive element 51 and therefore rotates with the force sensitive element 51. The pivot 61 is made of a wear resistant material such as tungsten carbide or an alloy referred to by the trade name Nevapoint. The pivot 61 is supported by a pair of jewels 62 which are located within jewel housing 63. The jewels 62 are preferably conventional jewels such as synthetic sapphire, although other hard bearing materials may be substituted. The jewels 62 are given a preload by being resiliently biased within their housing 63, by biasing means such as springs 64. The jewels 62 are biased toward one another and consequently toward the pivot 61.

The bearing housings 63 are threaded into the casting 55 so that the distance between the housings 63 can be adjusted by screwing the housings 63 closer together. When the distance between the jewels 62 is such that the pivot 61 is able to rotate without slop, the jewel housings 63 can be further threaded, with the jewels 62 receding against the springs 64. The springs 64 are designed to have a Hooke's law coefficient and pre-bias such that the screwing of the jewel housings 63 effects an adjustment of bearing pressure such that an acceptable range of bearing pressure is presented for adjustment during assembly. If bearing pressure is too light, the force sensitive element 51 becomes mechanically unstable in its position, whereas if bearing pressure is too great, bearing friction increases, causing the force sensitive element 51 to move irregularly. During assembly, the jewel housings 63 are screwed to adjust the bearing preload, while the stability of readings from the force measuring system are read. The bearing housings 63 are retained in position by conventional means such as by an anaerobic thread gripping compound (sold under the trade name Loc Tite).

Referring to FIG. 2, a small physical size (area) of the capacitor plates 19-21 plus the relatively large spacing between the plates 19-21 presents a small capacitance for capacitors 17 and 18 (shown in the circuit diagram of FIG. 1). In conventionally produced capacitors, the area of the capacitor plates can be much greater and the spacing between the plates can be substantially reduced. Therefore, the capacitance provided by the device shown in FIG. 2 is relatively limited. In the preferred embodiment, the accelerometer is made small in that the areas of each of the plates 19, 20, 21 are each preferrably less than 1 cm$^2$ on each side. The resultant capacitance is approximately 0.5 to 1.0 picofarads for capacitors 17 and 18 when the force sensitive element 51 is in the null position. Such a low capacitance results in the bridge circuit 13 of FIG. 1 having a very low gain output, with the error signal at conductor 35 being correspondingly low. Any stray capacitances add significantly to noise, reducing the signal-to-noise ratio of the error signal provided by conductor 35 to the amplifier 36. For this reason, it is important that the circuitry associated with the bridge circuit be as compact as possible and not located remotely from the plates 13, 21.

Referring to FIGS. 2 and 3, the circuit shown in FIG. 1, with the exception of capacitors 17 and 18, is formed as a hybrid integrated circuit 68. Capacitor plate 19, together with the hybrid integrated circuit 68, is mounted on the casting 55. Capacitor plate 20 is mounted to the casting 55 in a separate board 69. Certain circuit elements would, of course, be discrete elements, such as transistors 46 and 47, but preferably would be mounted to the hybrid circuit 68. As can be seen in FIG. 2, this arrangement enables the fixed plates 19, 21 to be stably mounted onto the casting 55, while providing a structure in which the circuitry, including the variable capacitors 17, 18 is compactly arranged so as to reduce stray capacitances and decrease other noise which would result from signals being conveyed over lengths of conductors. Moreover, as noted before, the jewel bearing assembly 52 is also fixed directly to the same casting 55 by threading the jewel housings 63 directly into the casting.

The securing of jewels resiliently within housings presents a very stable arrangement in which not only is the jewel accurately positioned, but the jewel need not be physically bonded in some manner to a separate substrate. Thus, the invention utilizes bearings which accurately hold their position and which use the superior qualities of jewel bearings without a need for specially securing such bearings to a substrate. As can be noted from FIGS. 2 and 3, the casting 55 directly supports the bearing assembly 52 from which the seismic mass 51, with its displaceable capacitor plate 41, extends. The casting 55 also supports the fixed capacitor plates 19, 20 via circuit boards 68, 69. This provides an enhancement in the stability of force measuring system construction while providing the advantages of compact circuitry. Furthermore, bearing preload adjustments are made directly from the casting 55 by adjusting spring tension without shifting the actual position of support points on the spring.

It should be clear from the above description of the preferred embodiment that numerous changes can be made to the structure without departing from the inventive features found herein. For example, it is possible to substitute a wide variety of circuits for the bridge and amplifier circuit described. Specifically, a circuit such as described by Hugli, et al. in U.S. Pat. No. 4,131,020 would quite clearly function with the inventive force measuring system construction. Other compact force measurement devices can be used in which the sensed force is other than that of acceleration of a seismic mass. While a one-axis force measuring system has been described, it is contemplated that multiple axis measurements can be effected with support modifications. For these reasons, the present invention should be read only as limited by the claims.

What is claimed is:

1. A force measuring sensor characterized by:
    (a) a support structure formed as a unitary member and supporting a pair of bearing housings and a circuit board including a circuit;
    (b) a movable element;
    (c) means for generating reactive force between the support structure and the movable element;
    (d) a pair of bearings, each retained within one of the bearing housings;
    (e) pivot means fixed to the movable element and cooperating with said pair of bearings to form a bearing assembly which pivotably supports the movable element on the support structure;
    (f) said circuit being a hybrid integrated circuit and including circuitry which translates a sensed displacement of the movable element to a first output;
    (g) means to accept a power amplifier on the hybrid circuit for providing a second output which has increased current level over the first output at high levels of sensed displacement of the movable element, with said second output having a current level approximating that of the first output at moderate amounts of sensed displacement, wherein the power amplifier may be selectively mounted in accordance with the intended application of the force measuring sensor and when either output is provided to the reactive force means, that output provides an indication of measuring force;
    (h) a capacitor having at least one displaceable plate and one stationary plate, said displaceable plate being fixed to the movable element and the circuit board being mounted on said stationary plate, said capacitor sensing the displacement of the movable element.

2. Apparatus as claimed in claim 1, further characterized by:
    the bearing housings being mounted to the support structure so that at least one of the bearings is threadably mounted to the support structure in a manner which enables the bearing housings to be adjusted in their separation from each other.

3. An accelerometer having a support structure, a movable element, means for generating reactive force between the support structure and the movable element, a bearing and pivot arrangement, a circuit board mounted to the support structure and including a circuit which translates a displacement of a movable element to an output provided to the reaction force means, thereby providing an indication of measured force, and a capacitor having at least one displaceable plate being fixed to the movable element and the circuit board being mounted on said stationary plate, characterized by:

(a) the support structure being formed as a unitary member and the bearing and pivot arrangement including a pair of bearings retained within bearing housings, the bearing housings being mounted to the support structure with at least one of the bearing housings being threadedly mounted to the support structure in a manner which enables the bearing housings to be adjusted in their separation from each other;

(b) the bearing and pivot arrangement including a pivot which is fixed to the movable element and cooperates with the pair of bearings to form a bearing assembly which pivotably supports the movable element on the support structure;

(c) said circuit including circuitry which translates a sensed displacement of the movable element to a first output; and (d) means to accept a power amplifier on the circuit for providing a second output which has increased current level over the first output at high levels of sensed displacement of the movable element, with said second output having a current level approximating that of the first output at moderate amounts of sensed displacement, wherein the power amplifier may be selectively mounted in accordance with the intended application of the force measuring sensor and when either output is provided to the reactive force means, that output provides an indication of measuring force.

4. Apparatus as claimed in claim 3, further characterized by the support structure being formed as a single piece of metal.

5. Apparatus as claimed in claim 3, further characterized by the bearings being jewel bearings.

6. Apparatus as claimed in claim 5, further characterized by:

(a) the bearings being positioned in the bearing housings so that they face one another;

(b) at least one of the bearings being resiliently mounted within its bearing housing so that it may retract from and move toward the other bearing; and (c) biasing means provided within said bearing housing having a retractable bearing, which biasing means biases the bearing toward the other bearing to establish a preload.

7. Apparatus according to claim 3, further characterized by:

said capacitor including a second stationary plate, the second stationary plate being fixed to the support structure in a position such that the displaceable plate is located between the two stationary plates.

8. Apparatus as claimed in claim 3, further characterized by:

the movable element being pivotably supported in such a way that the displaceable plate moves with respect to said stationary plate in a direction orthoganal to a plane defined by a surface of the movable plate.

9. Apparatus as claimed in claim 3, further characterized by:

the circuit board including a hybrid integrated circuit.

* * * * *